INVENTORS
*Harry Lister Riley*
*Andrzej Romanski*

INVENTORS
Harry Lister Riley
Andrzej Romanski
BY Bailey, Stephens and Huettig
ATTORNEY

United States Patent Office 3,352,887
Patented Nov. 14, 1967

3,352,887
METHOD OF PRODUCING PHTHALIC ANHYDRIDES
Harry Lister Riley, Oxford, and Andrzej Romanski, Sheffield, England, assignors to United Coke and Chemicals Company Limited, Rotherham, England
Original application Jan. 3, 1961, Ser. No. 79,971, now Patent No. 3,226,338, dated Dec. 28, 1965. Divided and this application Sept. 16, 1965, Ser. No. 487,828
Claims priority, application Great Britain, July 3, 1959, 22,973/59
The portion of the term of the patent subsequent to Dec. 28, 1982, has been disclaimed
1 Claim. (Cl. 260—346.4)

ABSTRACT OF THE DISCLOSURE

A catalyst composed of a glass formed from a mixture of vanadium pentoxide and potassium pyrosulfate and carried on silica gel particles is used in a fluidized bed to convert naphthalene vapor and air into phthalic anhydride.

---

This application is a division of our copending application Ser. No. 79,971, filed Jan. 3, 1961, now Patent No. 3,226,338 which in turn is a continuation-in-part of our copending application Ser. No. 38,858, filed June 27, 1960 for "Manufacture of Catalysts," now abandoned.

Many catalytic reactions in the vapor phase can advantageously be carried on with the catalyst in the form of particles fluidized by the reacting gases or vapors. Catalysts containing vanadium and potassium sulphate are used in this form in, for example, the oxidation of naphthalene to phthalic anhydride.

In the manufacture of catalysts containing vanadium and potassium sulphate hitherto, silica gel, made by a complicated process which involves the addition of sulphuric acid to potassium silicate solution, is formed with a slurry with a soluble vanadium compound, and the slurry is dried and heated to form the catalyst. Apart from the lengthy, costly and troublesome character of this method of manufacture, the resultant catalysts have the serious disadvantage that they are exceedingly friable and rapidly break down when used in a fluidized bed reactor and therefore tend not to fluidize uniformly. In addition, a quantity of catalyst dust is formed in the space above the bed and this causes the temperature above the bed to rise. Filters are normally provided in order to prevent catalyst particles from escaping, and as the temperature above the bed rises there is an increasing tendency for hot spots to form on the filters and damage them.

Our object is to produce improved catalyst particles, and we do this, according to the invention, by causing porous solid particles to absorb at least one material which is catalytic or becomes catalytic on decomposition or other change in the course of or after the absorption. For simplicity of description, all such materials will be called "catalytic materials" herein. The process of absorption of the catalytic material by the solid particles is carried out at a temperature at which the catalytic material melts. In carrying out our invention, we form a fluidized bed of the porous particles and particles of the catalytic material and we maintain the bed fluidized at the required temperature until the catalytic material is taken up by the porous particles.

The invention can be applied to the manufacture of catalysts for use in various different reactions. The necessary characteristic of the catalytic material is that it must be capable of being introduced in the form of solid particles into the fluidized bed of porous particles, and the solid particles of catalytic material must melt at the temperature of the bed and wet the porous particles so that the resultant liquid spreads out over and is absorbed or adsorbed by the porous particles, which are in effect carriers of the catalytic material.

It is important that the catalytic material should be wholly taken up by the carrier particles. The catalytic material should not form a continuous thick layer on the outer surface because the mass of particles might then bind together when used as a catalyst. It is necessary, of course, to choose the porous carrier particles with proper regard to both the catalytic material and the reaction in which the catalyst is to be used.

The carrier particles may most conveniently be silica gel, but may be, for instance, activated alumina, pumice, zeolites, clays or metallic oxides, provided that they are porous and stable at the fluidizing temperature. However, not every silica gel is suitable as a carrier in every catalytic reaction. An empirical test is to mix the silica gel or other carrier particles with the catalytic material in the desired proportions and heat the mixture in a muffle furnace at a temperature above the melting point of the catalytic material with intermittent stirring. After a few hours, suitable carrier particles will give a dry mobile powder, whereas unsuitable carrier particles will become a sticky agglomerated mass.

The degree of porosity of the carrier particles may vary considerably. In any case, the carrier particles must not sinter together at the temperatures at which the catalyst is to be used.

We find that the smaller the size of the individual particles of the carrier, the greater the proportional amount of the catalytic material they will take up. The smaller particles become completely impregnated first, i.e. in a given time the amount of the catalytic material taken up is inversely proportional to the radius of the particle. This result is advantageous when the catalyst is fluidized in reacting gases because the smaller particles become heavier and therefore less liable to be blown out of the fluidized bed. Typical particle size grading for silica gel are 50 to 200 B.S. (British Standard) sieves.

The means by which the objects of the invention are obtained are described more fully with reference to the accompanying drawings, in which.

Figure 1:
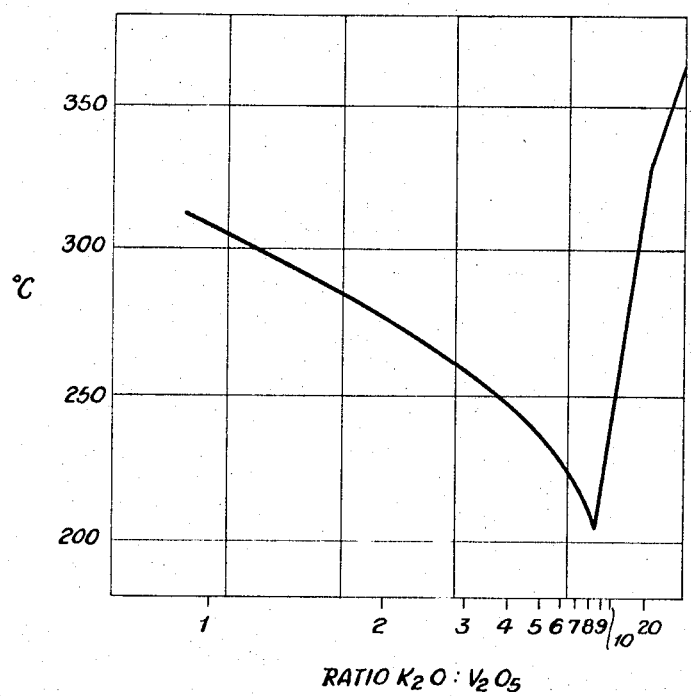
FIGURE 1 is a graph of the softening point of one form of catalytic material.

The invention is particularly applicable to catalysts containing vanadium and potassium sulphate for use in the manufacture of phthalic anhydride. A mixture of vanadium pentoxide and potassium pyrosulphate when fused yields a glass which can be ground to fine particles and which has no sharp melting point. The softening point of such a mixture depends on the molar ratio of the potassium pyrosulphate to the vanadium pentoxide. This is illustrated by FIGURE 1 of the accompanying drawings, which is a graph of the molar ratio as $K_2O:V_2O_5$ plotted as abscissae against the softening point of resultant glass (measured by the ball and ring method) plotted as ordinates. As may be seen from the graph the softening point is at a minimum when the molar ratio is about 8.5. The molar ratio in the catalyst is of importance in determining its reactivity, and is preferably within the range 1.0 to 6.0. Within this range, the softening point is below 320° C., so if the temperature in the fluidized bed is from 350 to 400° C. the glass will readily spread as a liquid over the surfaces of the carrier particles. The final activation of the catalyst should be carried out at a temperature of 400 to 420° C.

Figure 2:
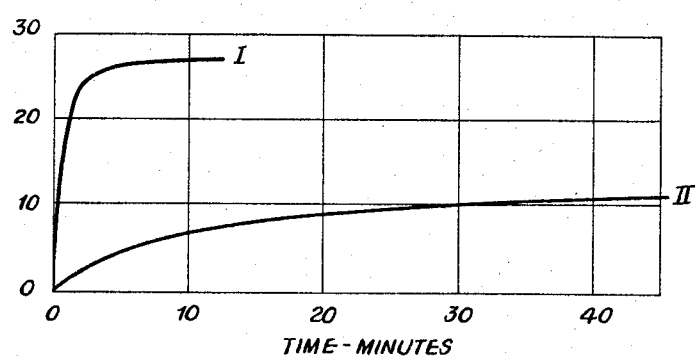
FIGURE 2 is a graph of the heat of wetting of two different silica gels.

The heat of wetting and the pore size may also be used to determine the suitability of porous particles used as carriers in catalysts for use in the production of phthalic anhydride. For instance, two silica gels commercially available give the curves shown in FIGURE 2 of the accompanying drawings. When wetted with tributyl citrate, the heat of wetting in calories per gram is plotted as ordinates against the time in minutes plotted as abscissae. The curve marked I shows a high heat of wetting for the first silica gel indicating that it has a large internal surface area. The curve marked II shows a low heat of wetting extending over a long period and indicates that the second silica gel II has a smaller pore diameter with a larger internal surface area than the first. Both these gels have high internal specific surfaces as measured by nitrogen absorption (500 sq. m./g. for the first gel and 710 sq. m./g. for the second), but the pore diameter of the first gel (53 A.) is much larger than that of the second (14 A.). The first gel is suitable for use in a catalyst to be used in the production of phthalic anhydride, but the second is not. Broadly, it may be said that for this purpose a high heat of wetting and a pore size of at least 40 A. are required.

The ratio of catalytic material to carrier particles can vary widely. For example, with silica gel and the glass of vanadium and potassium sulphate, the glass may be from 1 to 35% by weight of the catalyst. Very satisfactory results are obtained with 25% by weight of a glass of molar ratio $K_2O:V_2O_5$ of 4:1. This gives a lower concentration of $V_2O_5$ in the final catalyst, about 4%, than the 9 to 10% in the catalysts made by the method usual hitherto. As the catalyst is as effective as the prior catalysts there is thus a saving of vanadium. In addition, the novel catalyst does not break down so readily.

Figure 3:
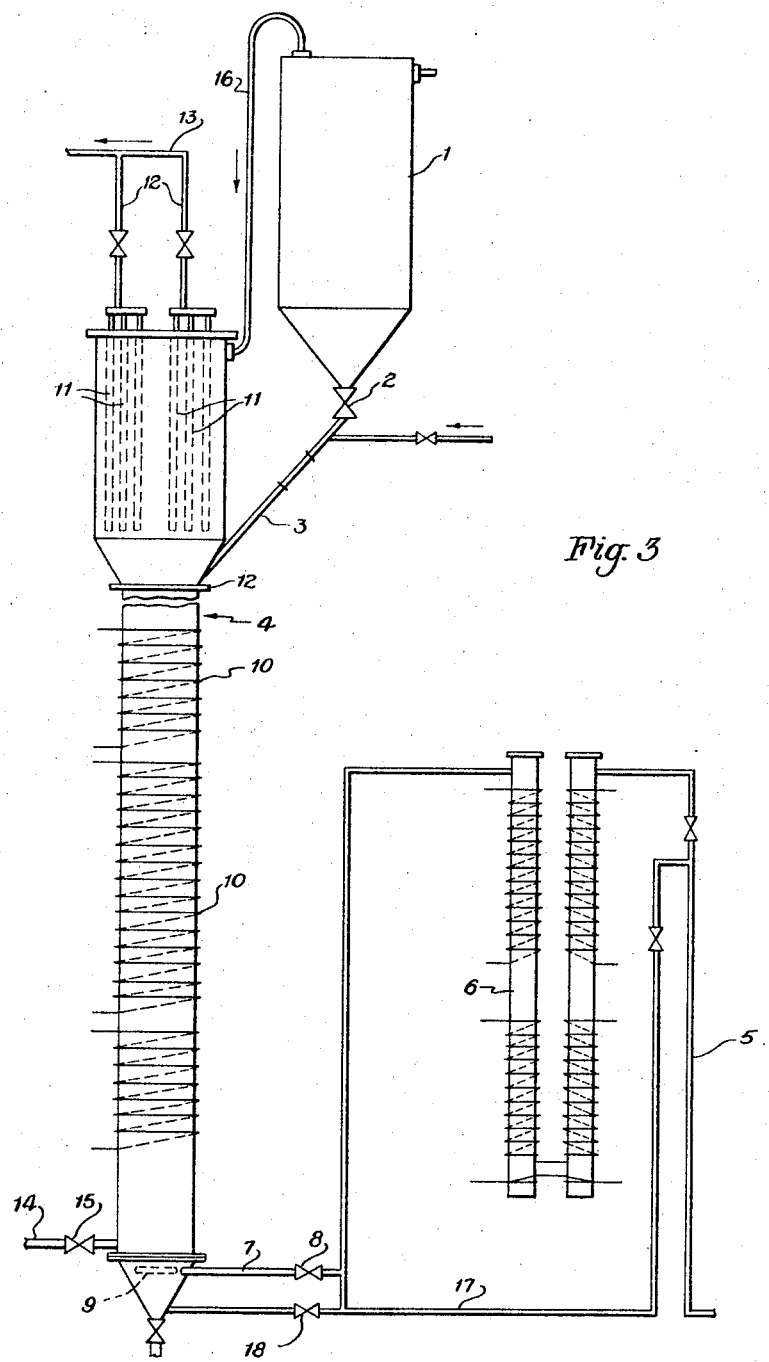
FIGURE 3 is a diagrammatic view of an apparatus for carrying out the process of this invention.

One process according to the invention will now be described with reference to FIGURE 3 of the accompanying drawings, which shows diagrammatically a plant in which the process may be carried out.

The process described is for the manufacture of a catalyst for use in the production of phthalic anhydride. First a mixture of vanadium pentoxide and potassium pyrosulphate is melted, cast, ground to about 100 B.S. sieve mesh, weighed and mixed in a tumbling mill with some silica gel particles of 40 to 60 A. pore size and of particle size between 50 and 200 B.S. sieve mesh.

The mixture is charged into a closed hopper 1 from which it can pass under the control of a valve 2 down a pipe 3 into a fluidizing column 4. Compressed air supplied through a pipe 5 flows through a preheater 6, which is externally heated electrically, and a pipe 7 to the base of the column 4 under the control of a valve 8 and emerges through a distributing ring 9. This air flows upwards through the column to maintain the particles fluidized in the column. The temperature in the column is maintained between 350 and 400° C. by external heating elements 10. At the top of the column there are filters 11, through which the air passes to flow to a chimney through pipes 12 and 13.

At the base of the column there is an outlet 14 controlled by a valve 15, which is opened when the production of the catalyst is complete while the flow of air is maintained so that the catalyst is discharged in fluidized form, to be collected in drums.

For ease of delivery of the material from the hopper 1 to the column 4, the particles in the hopper are occasionally fluidized. The air stream used to do this may be bled off from the main air stream which flows up the column. This air leaves the hopper through a pipe 16 and passes to the filters 11, thus avoiding the provision of separate filters on the hopper.

It is possible for the main air flow from the pipe 5 to by-pass the heater 6 through a pipe 17 controlled by a valve 18, so that cold air may be blown through the column 4 when it is empty to clear it of dust.

As an example, one column 4 was 23 feet high and 14 inches in diameter, and in it 480 pounds of silica gel were fluidized by air at from 350 to 400° C., the air velocity being ½-foot per second in the empty column. 160 pounds of the powdered vanadium pentoxide potassium pyrosulphate glass mixed with 108 pounds of silica gel were added over a period of 3 hours. The fluidization was maintained for a total of 8 hours, during the final 2 hours of which the temperature was increased to about 420° C. to activate the catalyst.

The pore structure of silica gel tends to shrink and collapse at about 600° C. so the temperature in the column must be well below this figure and advantageously below 500° C. when the carrier particles are of silica gel.

The fluidized bed technique employed in the apparatus illustrated is extremely advantageous, being simple, leading to very rapid and perfect mixing, enabling the temperature to be closely and exactly controlled and involving plant of low capital cost having a high rate of production.

Having now described the means by which the objects of the invention are obtained,

We claim:

A method of producing phthalic anhydride which comprises passing a mixture of naphthalene vapor and air in contact with a fluidized bed containing a catalyst comprising particles of silica gel having a pore size of from about 40 to 60 A. and a maximum sieve size of about 50 B.S. carrying a liquid deposited glass composed of a mixture of vanadium pentoxide and potassium pyrosulphate having a molar ratio of $K_2O:V_2O_5$ between 1.0 and 6.0 and a softening temperature below 320° C., and said glass amounting to from about 1 to 35 percent by weight of the total mass of particles.

References Cited

UNITED STATES PATENTS

| 2,973,371 | 2/1961 | Chomitz et al. | 260—346.4 |
| 3,226,338 | 12/1965 | Riley et al. | 252—440 |

ALTON D. ROLLINS, *Primary Examiner.*

B. DENTZ, *Assistant Examiner.*